Jan. 16, 1962     E. D. IDZI     3,017,127
APPARATUS FOR SHAVING ICE
Filed Feb. 25, 1960                            5 Sheets-Sheet 1

INVENTOR
Edward D. Idzi
BY Ogle R. Singleton
ATTORNEY

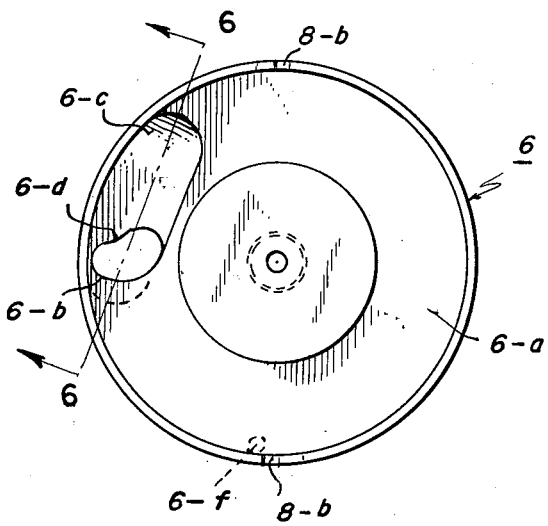
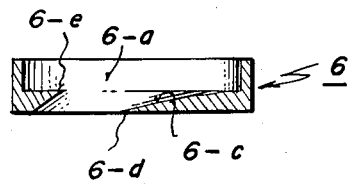
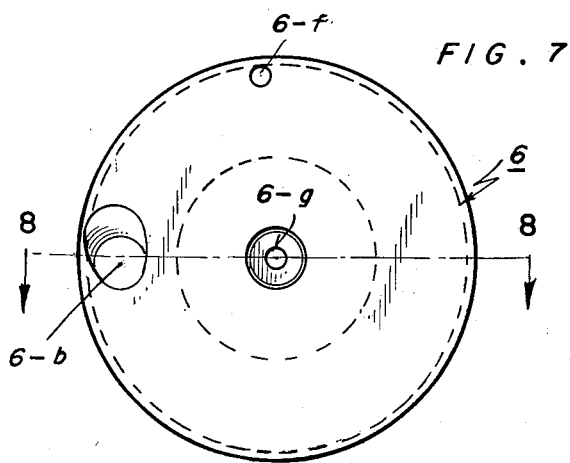
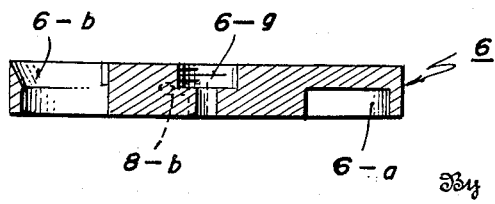

Jan. 16, 1962 E. D. IDZI 3,017,127
APPARATUS FOR SHAVING ICE
Filed Feb. 25, 1960 5 Sheets-Sheet 5
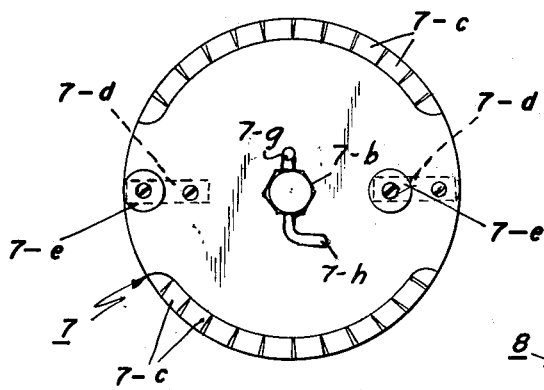
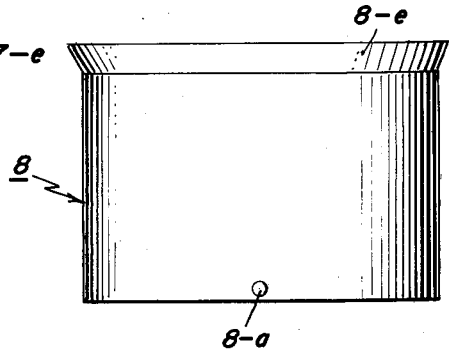
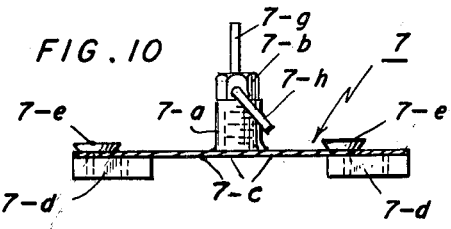
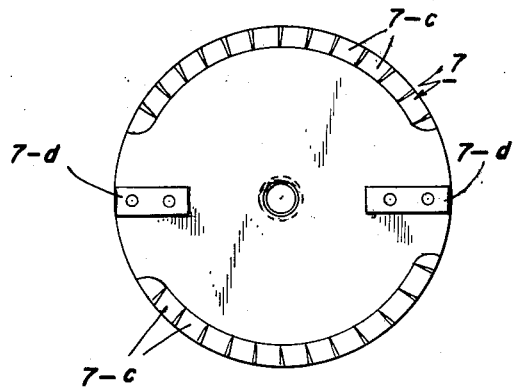
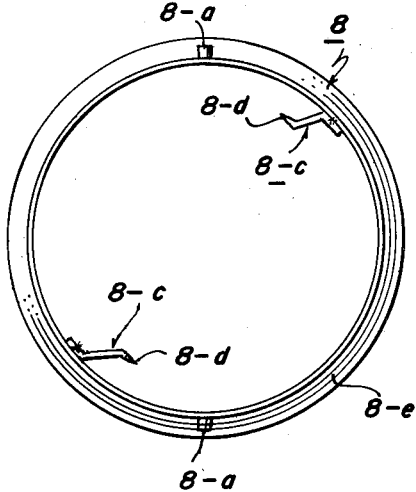
INVENTOR
Edward D. Idzi
BY *Ogle R. Singleton*
ATTORNEY 3,017,127
APPARATUS FOR SHAVING ICE
Edward D. Idzi, 7109 Pulaski Highway, Baltimore 6, Md.
Filed Feb. 25, 1960, Ser. No. 10,946
2 Claims. (Cl. 241—257)

My invention consists in a new and useful improvement in apparatus for shaving ice and is designed more particularly for shaving ice from ice cubes or other similar pieces of ice, to produce "snow" to be discharged from the apparatus into glasses or other similar containers. The particularly novel and useful feature of my improved device is the combination of a hollow body containing shaving mechanism powered by an electric motor. The valuable feature of the apparatus is the novel mounting of the mechanism and motor in the hollow body. The mechanism comprises a base plate, a cutter plate and a retaining wall, the motor having its casing suspended from the base plate, and its drive shaft connected to the cutter plate. By reason of the novel assembly of the mechanism and the motor all of the operating parts can be mounted in the hollow body and removed therefrom as a unit, thus greatly facilitating cleaning of the parts after use.

Another valuable feature of the apparatus is the combination of wiring for the motor and an automatic switch therefor actuated by positioning in the device the container for the "snow," the motor actuating the shaving mechanism only when the container is suitably disposed to receive the "snow."

While I have illustrated in the drawings and hereinafter fully describe one specific embodiment of my invention, it is to be distinctly understood that I do not consider my invention to be limited to said specific embodiment but refer for its scope to the claims appended hereto.

In the drawings:

FIG. 5 is a top plan of a base plate.

FIG. 6 is a vertical section on the line 6—6 of FIG. 5, in the direction of the arrows.

FIG. 7 is a bottom plan of said plate.

FIG. 8 is a vertical section on the line 8—8 of FIG. 7, in the direction of the arrows.

FIG. 9 is a top plan of a cutter plate.

FIG. 10 is a side elevation of said cutter plate.

FIG. 11 is a bottom plan of said cutter plate.

FIG. 12 is a side elevation of a retainer wall.

FIG. 13 is a top plan of said wall.

Figure 2:
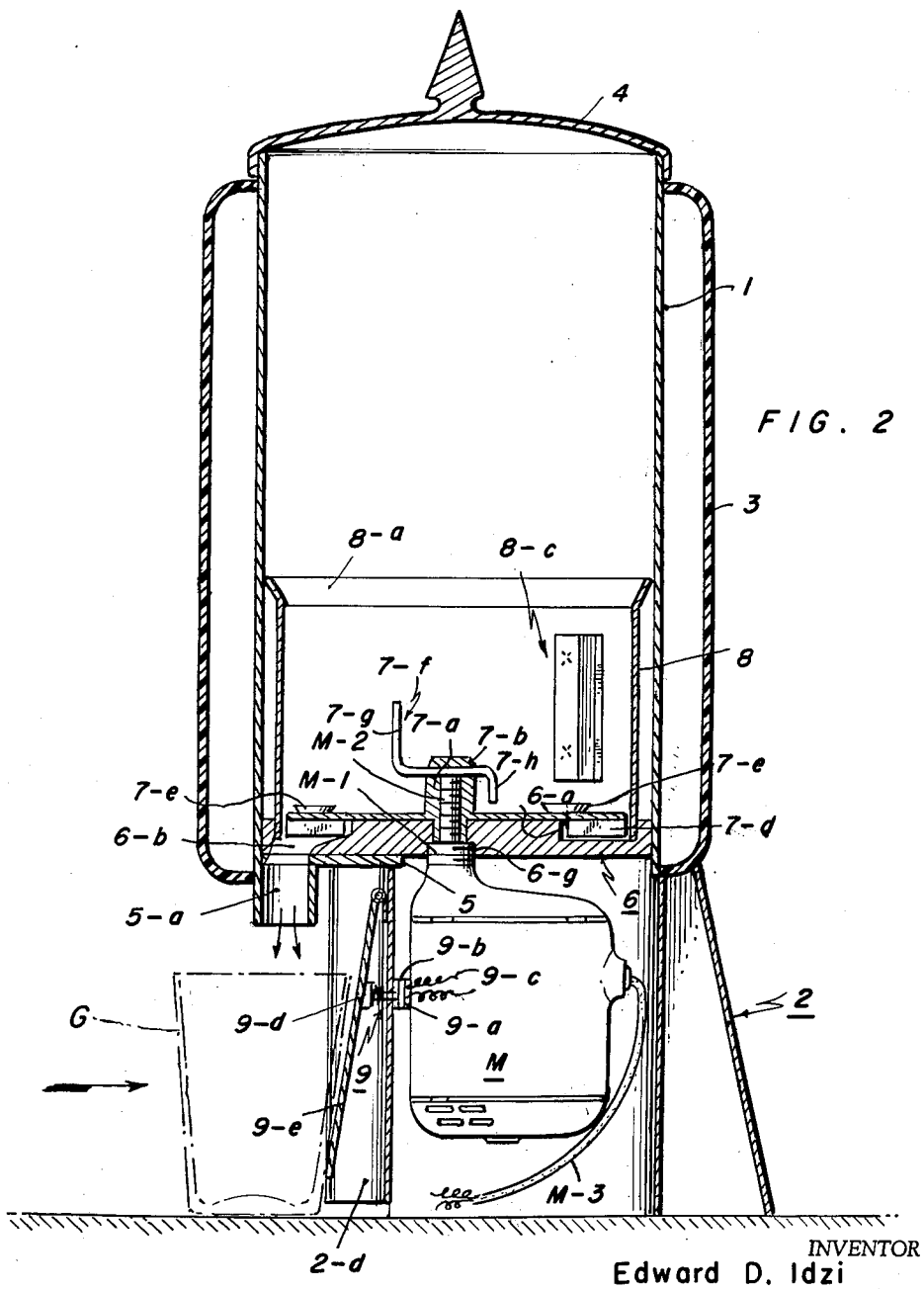
FIG. 2 is a vertical section on the line 2—2 of FIG. 1, in the direction of the arrows.
Figure 3:
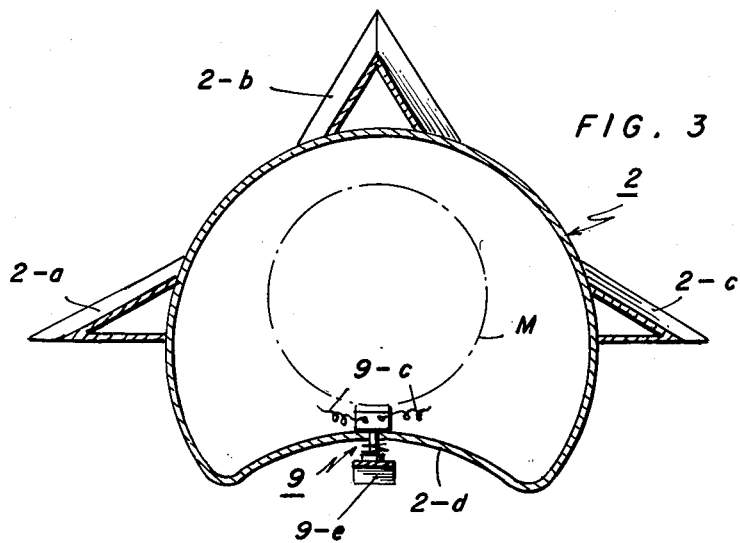
FIG. 3 is a horizontal section on the line 3—3 of FIG. 1, in the direction of the arrows.

As shown in the drawings, my apparatus has a hollow, cylindrical body 1 (FIG. 2) mounted upon a hollow base 2 having three legs 2–a, 2–b and 2–c with a concave wall 2–d disposed between legs 2–a and 2–c at the front of the apparatus (FIG. 3). I provide an insulating jacket 3 (FIGS. 1, 2 and 4) extending from the top of the body 1 to the base 2. A removable cover 4 (FIGS. 1 and 2) closes the top of the body 1.

Figure 1:
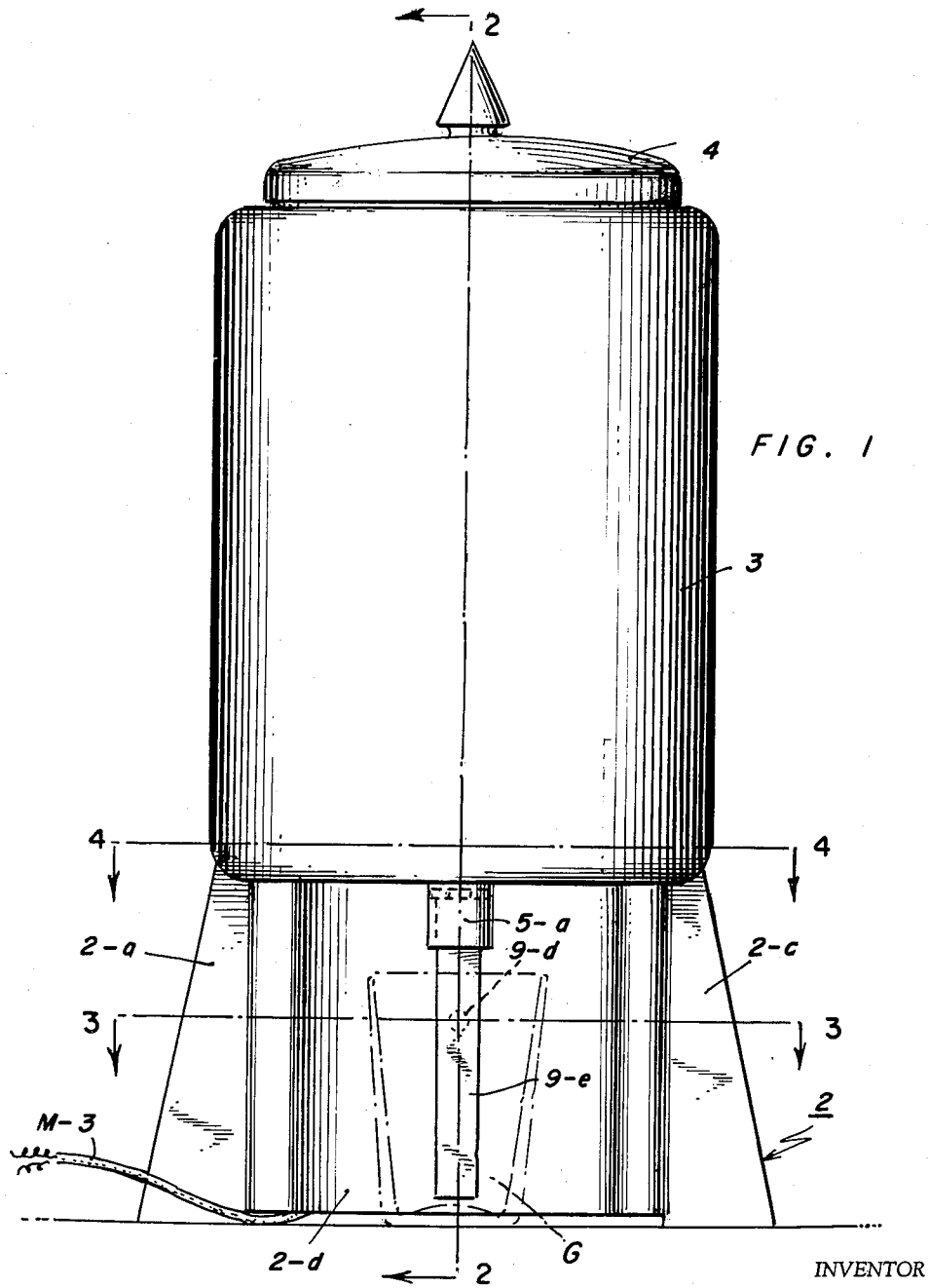
FIG. 1 is a front elevation of my apparatus.
Figure 4:
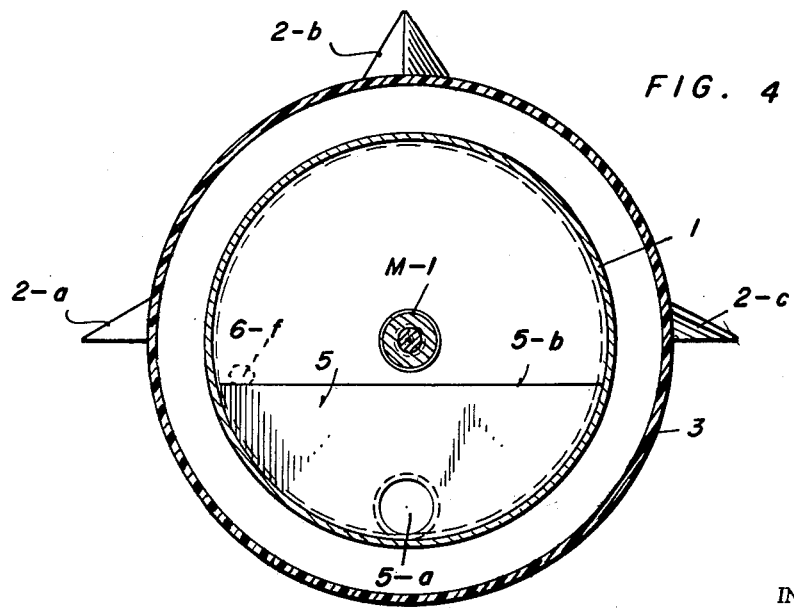
FIG. 4 is a horizontal section on the line 4—4 of FIG. 1, in the direction of the arrows.

A segmental horizontal plate 5 (FIGS. 2 and 4) is mounted at the bottom of the body 1 and has a depending discharge throat 5–a (FIGS. 1, 2 and 4).

Carried by the plate 5 there is a removable base plate 6 (FIGS. 2, 5, 6, 7 and 8) having a peripheral passageway 6–a in its upper face with a discharge opening 6–b to co-act with the discharge throat 5–a in the plate 5.

It will be noted (FIGS. 5, 6 and 7) that the opening 6–b is so produced in the plate 6 as to provide (FIG. 6) a downwardly inclined surface 6–c with a knife-edge 6–d at the bottom of the plate 6 and a knife-edge 6–e at the bottom of the passageway 6–a.

A stop-pin 6–f depends from the bottom of the plate 6 to co-act with the edge 5–b of the plate 5 to register the opening 6–b with the discharge throat 5–a.

The plate 6 has a central orifice 6–g in the lower portion of which is threaded the casing M–1 of the motor M (FIG. 2), with a left-hand thread. Thus it is obvious that the motor M is carried by the removable plate 6.

A cutter plate 7 (FIGS. 2, 9, 10 and 11) has an upstanding central boss 7–a in which is threaded, with a right-hand thread, the drive shaft M–2 of the motor M, passed upwardly through the orifice 6–g in the plate 6. The boss 7–a has a hex-head 7–b (FIGS. 9 and 10). When the plate 7 is fixed on the shaft M–2 it is positioned closely above the plate 6 (FIG. 2).

The plate 7 has a plurality of peripheral cutter blades 7–c (FIGS. 9 and 10) angularly pitched relative the horizontal surface of the plate 7 and adapted to discharge particles of shaved ice into the passageway 6–a in the plate 6. The plate 7 has mounted upon its lower face a pair of diametrical plows 7–d loosely fitted in the passageway 6–a (FIGS. 2, 9, 10 and 11). The plate 7 has mounted upon its upper surface a pair of circular cutters 7–e. It will be noted (FIGS. 9 and 10) that these cutters 7–e are relatively displaced on the diameter of the plate 7. The plate 7 has an agitating rod 7–f mounted in the boss 7–a (FIGS. 2, 9 and 10), one end of which 7–g is vertically disposed and the other end 7–h is slanted downwardly.

I provide a removably mounted cylindrical retaining wall 8 (FIGS. 2, 12 and 13), the lower end of which is received in the outer edge of the passageway 6–a of the plate 6 and has bayonet latches with pins 8–a (FIGS. 12 and 13) on the wall 8 and slots 8–b in the plate 6 (FIG. 5). The wall 8 has a pair of diametrical, longitudinal, inwardly extending baffles 8–c with cutting blades 8–d (FIGS. 2 and 13), and a flared top peripheral portion 8–e fitting snugly in the body 1 (FIG. 2).

I provide an electric switch 9 (FIGS. 1 and 2) having a male member 9–a and a female member 9–b mounted upon the casing M–1 of the motor M and the base 2, respectively. The member 9–a has wires 9–c connected with the electric supply wires M–3 of the motor M, and the member 9–b has a button 9–d for closing the circuit through members 9–a and 9–b and biased into open position. A lever 9–e is pivoted on the base 2 and is adapted to move the button 9–d to closing position when rocked by a glass G placed in the recess formed by the concave wall 2–d and thereby positioned under the discharge throat 5–a (FIGS. 1 and 2).

Having described the structural details of my improved apparatus, I will now describe its operation.

When the wires M–3 of the motor M have been connected to a source of electricity, the male member 9–a has been plugged into the female member 9–b of the switch 9, the hollow body 1 has been charged with the pieces of ice to be shaved, and the top 4 replaced, the glass G is pushed into the recess formed by the concave wall 2–d and positioned under the discharge throat 5–a, thereby rocking the lever 9–e of the switch 9 to move the button 9–d to close the switch 9, thereby energizing the motor M, the shaft M–2 of which rotates the cutter plate 7. The pieces of ice introduced into the body 1, having passed downwardly through the retaining wall 8, to seat on the cutter plate 7, are shaved by the combined action of the cutter blades 7–c and the cutters 7–e. The shaved particles of ice, passing through the interstices between the blades 7–c, enter the peripheral passageway 6–a in the plate 6 and are carried by the plows 7–d to the opening 6-b and pass through the plate 6 and the discharge throat 5-a into the glass G.

It is obvious that the ends 7-g and 7-h of the agitating rod 7-f serve to stir the pieces of ice fed to the cutters, to prevent clogging, and that the baffles 8-c, which are non-rotatable, aid in directing the pieces of ice toward the cutters, their cutting blades 8-d assisting in breaking up the pieces of ice.

Having described my invention, what I claim is:

1. In an apparatus for shaving ice, the combination of a hollow cylindrical body; a segmental, horizontal plate integral with the bottom of said body, and having a dependent, discharge throat; a circular base plate removably mounted on said segmental plate, and having a discharge opening registered with said dependent discharge throat, said base plate having a central orifice; an electric motor having a casing and a drive shaft, said casing being threaded in said said orifice, and said shaft extending out of said casing through said base plate; and a cutter plate threaded on said shaft.

2. An apparatus, according to claim 1, in which said segmental, horizontal plate, and said motor casing are so dimensioned that said base plate carrying said motor can be lowered through said body and seated on said segmental plate, and can be lifted through said body and removed therefrom.

References Cited in the file of this patent

UNITED STATES PATENTS

| | | |
|---|---|---|
| 2,564,551 | Vazieux et al. | Aug. 14, 1951 |
| 2,664,002 | Anderson | Dec. 29, 1953 |
| 2,665,852 | Shively | Jan. 12, 1954 |
| 2,744,203 | Collura | May 1, 1956 |
| 2,787,174 | Hyde | Apr. 2, 1957 |
| 2,852,200 | Holzer | Sept. 16, 1958 |